(12) United States Patent
Arai et al.

(10) Patent No.: US 8,233,173 B2
(45) Date of Patent: Jul. 31, 2012

(54) COMPUTER READABLE MEDIUM FOR IMAGE PROCESSING, IMAGE PROCESSING METHOD, IMAGE PROCESSING DEVICE, AND IMAGE PROCESSING SYSTEM

(75) Inventors: Toshiaki Arai, Kanagawa (JP); Masafumi Ono, Kanagawa (JP); Kazuko Kirihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1568 days.

(21) Appl. No.: 11/485,385

(22) Filed: Jul. 13, 2006

(65) Prior Publication Data

US 2007/0133037 A1   Jun. 14, 2007

(30) Foreign Application Priority Data

Dec. 13, 2005   (JP) ................................. 2005-359210

(51) Int. Cl.
*G06F 3/12* (2006.01)
(52) U.S. Cl. ...................... 358/1.15; 707/758; 358/1.14
(58) Field of Classification Search ........... 358/1.1–1.16
See application file for complete search history.

(56) References Cited

U.S. PATENT DOCUMENTS

| | | | |
|---|---|---|---|
| 6,408,301 B1 * | 6/2002 | Patton et al. ........................... | 1/1 |
| 6,567,180 B1 * | 5/2003 | Kageyama et al. .......... | 358/1.15 |
| 2004/0125402 A1 * | 7/2004 | Kanai et al. ................. | 358/1.15 |
| 2007/0133043 A1 | 6/2007 | Maekawa et al. | |
| 2007/0135930 A1 | 6/2007 | Kirihara et al. | |
| 2007/0143361 A1 | 6/2007 | Arai et al. | |

FOREIGN PATENT DOCUMENTS

| | | |
|---|---|---|
| JP | A-6-231185 | 8/1994 |
| JP | A-10-187364 | 7/1998 |
| JP | A-2000-311074 | 11/2000 |
| JP | A-2003-330677 | 11/2003 |
| JP | A-2004-86764 | 3/2004 |
| JP | A 2004-192273 | 7/2004 |
| JP | A-2004-288038 | 10/2004 |
| JP | A-2006-197230 | 7/2006 |
| JP | A-2007-68100 | 3/2007 |
| JP | A-2007-160674 | 6/2007 |
| JP | A-2007-166175 | 6/2007 |
| JP | A-2007-166176 | 6/2007 |
| JP | A-2007-166179 | 6/2007 |
| JP | B2-4194597 | 10/2008 |
| JP | B2-4264568 | 2/2009 |

OTHER PUBLICATIONS

Oct. 19, 2010 Office Action issued in Japanese Patent Application No. 2005-359210 (with translation).
Office Action issued in JP Application No. 2005-359210 on Jan. 11, 2011 (with English translation).

* cited by examiner

*Primary Examiner* — Thomas Lett
*Assistant Examiner* — Michael Tzeng
(74) *Attorney, Agent, or Firm* — Oliff & Berridge, PLC

(57) ABSTRACT

There is provided a computer readable medium storing a program causing a computer to execute a function for an image processing. The function comprises: executing a job; creating a log image from an image handled in the job; setting a creation guarantee level of the log image; and controlling the execution of the job to be completed after the log image is created, if the creation guarantee level is set to a high level.

10 Claims, 5 Drawing Sheets

COMPUTER READABLE MEDIUM FOR IMAGE PROCESSING, IMAGE PROCESSING METHOD, IMAGE PROCESSING DEVICE, AND IMAGE PROCESSING SYSTEM

CROSS-REFERENCE TO RELATED APPLICATIONS

This application is based on and claims the benefit of priority from the prior Japanese Patent Application No. 2005-359210, filed on Dec. 13, 2005; the entire contents of which are incorporated herein by reference.

BACKGROUND

1. Technical Field

The present invention relates to job log control for controlling an executed job such as copying, printing, scanning, or faxing as a job log (executive logging of a job), and in particular to computer readable medium for an image processing program, an image processing method, an image processing device, and an image processing system each having an image logging function for creating an log image from an image handled by a job and transferring the log image to an external device.

2. Related Art

A printing system including a plurality of clients and a printer connected to a local area network (LAN) and allowing a plurality of users to use the printer in common has been known.

SUMMARY

According to an aspect of the invention, there is provided a computer readable medium storing a program causing a computer to execute a function for an image processing. The function comprises: executing a job; creating a log image from an image handled in the job; setting a creation guarantee level of the log image; and controlling the execution of the job to be completed after the log image is created, if the creation guarantee level is set to a high level.

BRIEF DESCRIPTION OF THE DRAWINGS

Embodiments of the present invention will be described in detail based on the following figures, wherein.

DETAILED DESCRIPTION

Figure 1:
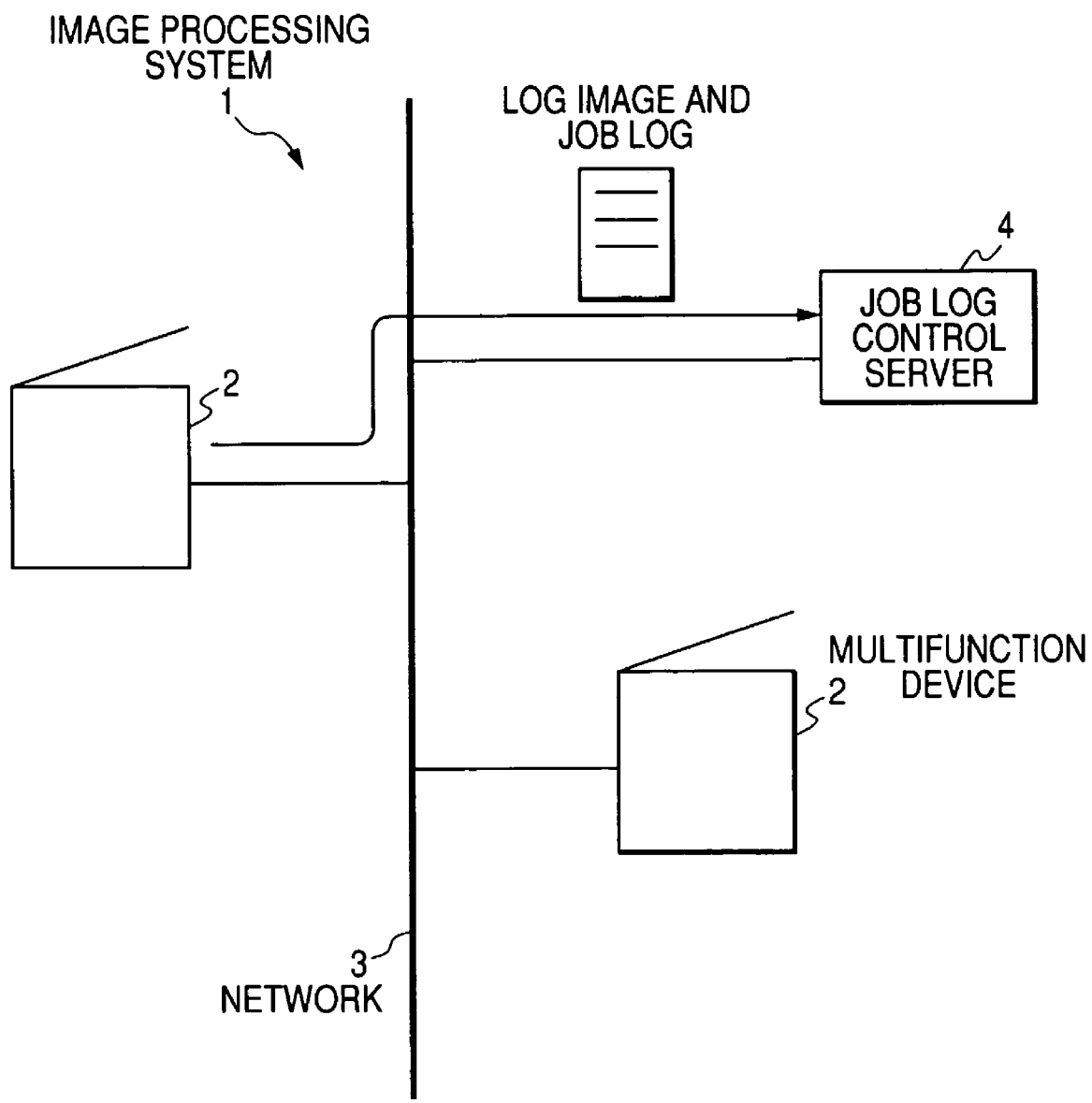
FIG. 1 is a diagram for showing an image processing system according to an exemplary embodiment of the invention.

FIG. 1 shows an image processing system according to an exemplary embodiment of the invention. The image processing system 1 is provided with multifunction devices 2, as a plurality of image processing devices, each having an image logging function for generating a job log in accordance with execution of the job, creating a log image from the image handled by the job, and transferring the log image to an external device, and a job log control server 4 for storing the job log and the log image transferred from each of the multifunction devices 2 via a network 3. To the network 3, one or more of user terminals (not shown) each composed of a personal computer (PC) can be connected.

The image logging function includes a function of generating the job log and the log image and transferring them to the control server. The log image is created from the image handled by the job, and includes, for example, a reduced image, an image of a selected page, an image of all pages.

The job may include not only a single job but also a job flow composed of a plurality of jobs. Since the common image is used be the plurality of jobs in the job flow, the log image is created from the common image. An image being used by the job or an image after use of the job is included in "an image handled in the job."

The external device may include a control server for controlling one or more of image processing devices, an external storage device, and so on.

The image processing device may include a single function device such as a copy machine, a printer, a scanner, a facsimile machine, and so on, a multifunction device including functions of copying, printing, scanning, faxing, and so on, and a system composed of a copy machine, a printer, a scanner, a facsimile machine, and so on.

The image logging function processed by the image processing system includes a function that the multifunction device 2 accumulates the log image in conjunction with the job log and a function that the job log control server 4 accumulates the job log and the log image associated with each other besides the function of generating by the multifunction device the job log and the log image described above and transferring them to the job log control server 4.

Figure 2:
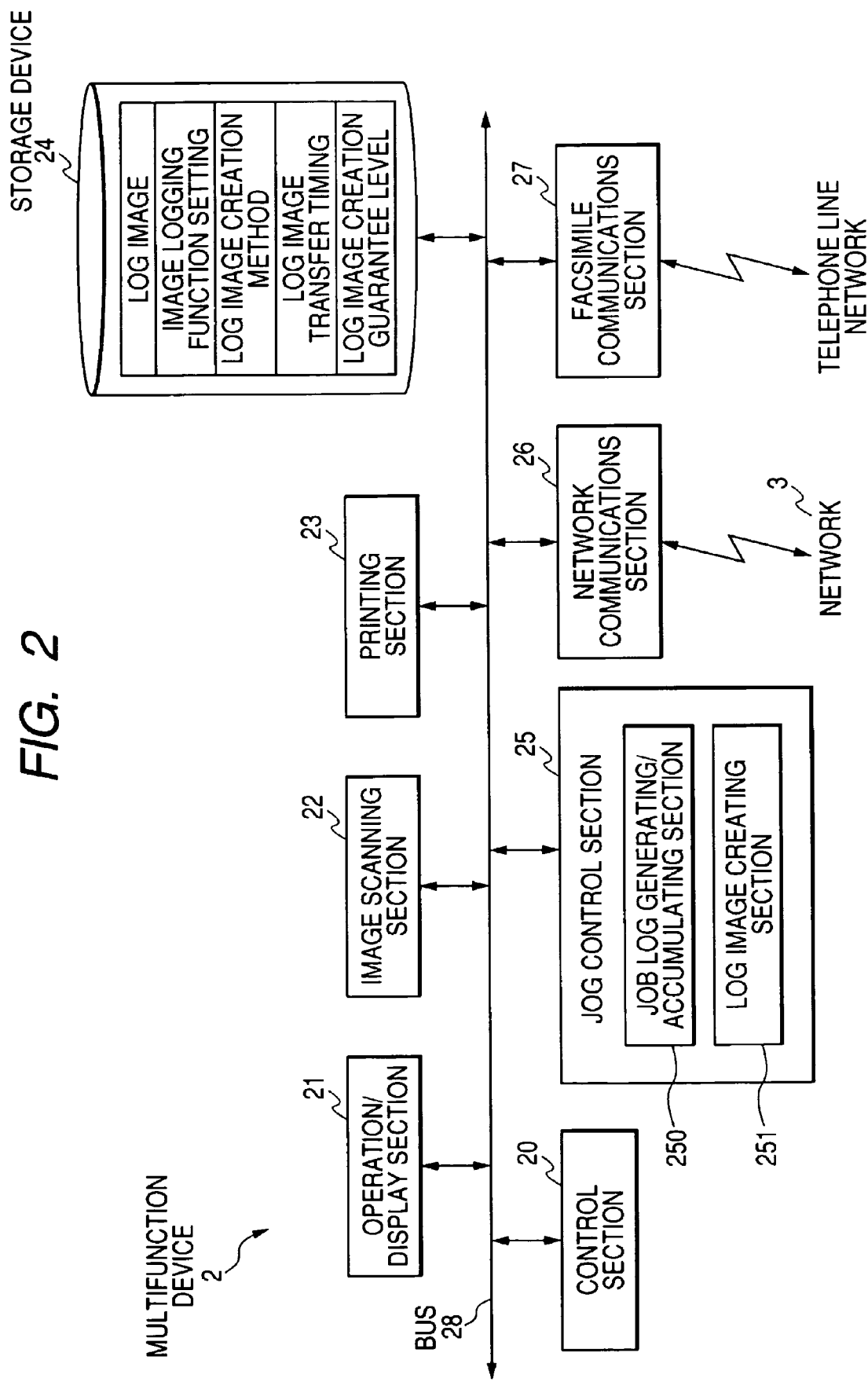
FIG. 2 is a block diagram of a multifunction device according to the exemplary embodiment.

FIG. 2 is a block diagram of the multifunction device 2. The multifunction device 2 includes a control section 20 equipped with a CPU, a ROM, a RAM, and so on, and for controlling every section of the multifunction device 2, an operation/display section 21 provided with a touch panel display composed of a display and a touch panel stacked on the surface of the display and a hard key such as a start key, an image scanning section 22 for optically scanning a document to read out the image, a printing section 23 for printing an image on a sheet by, for example, an electrophotographic method, a storage device 24 composed of an HDD and so on for storing various information such as a setting screen, setting information or images, a job control section 25 for issuing a job ID in response to reception of a job and generating a job log and so on after the job has been executed, a network communications section 26 connected to the network 3, and a facsimile communications section 27 connected to the telephone line network or the like, all connected to each other via a bus 28.

The multifunction device 2 has plural functions such as copying, printing, scanning, faxing, and e-mailing. A job processes an image using one or more of these functions. A job is accepted by the operation/display section 21, or can be accepted from a user terminal (not shown) connected to the network 3, and composed of a PC or the like.

In the ROM of the control section 20 or the storage device 24, there are stored various programs such as a job execution program and an image processing program shown in a flowchart of FIG. 4 described later. And, the CPU of the control section 20 controls every section of the multifunction device 2 in accordance with the program stored in the ROM or the storage device 24.

The job control section 25 includes a job log generating/accumulating section 250 for generating the job log after the job has been executed and accumulating the job log, and a log image creating section 251 for creating a log image from the image handled in the job. The job control section 25 operates under the control of the CPU of the control section 20 to accumulate the log image created by the log image creating section 251 in the storage device 24 in conjunction with the multifunction device ID and the job ID.

The job log includes, for example, the multifunction ID, the job ID, the job type, a user name, the job reception time, the job finish time, and the job status information such as waiting, processing, suspended, or completed.

The log image creating section 251 executes the process in accordance with the log image creating method stored in the storage device 24 on the image handled by the job to create the log image. As the log image creating method, for example, a method of lowering the resolution of the image and a method of selecting a page used as the log image can be cited.

The storage device 24 also stores image logging function setting information set by the administrator, the log image creating method, log image transfer timing information, a log image creation guarantee level, and so on besides the log images described above.

Figure 3:
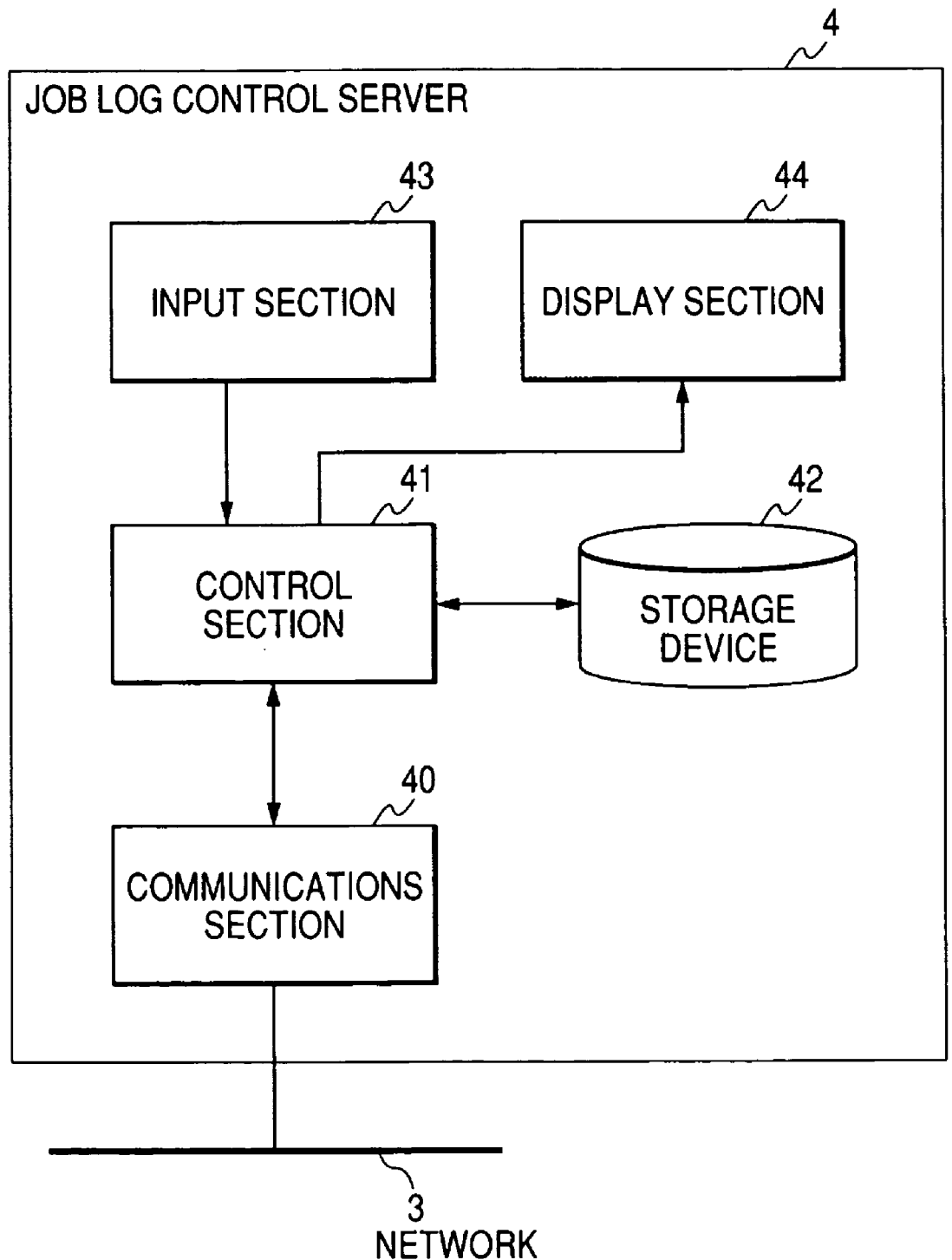
FIG. 3 is a block diagram of a job control server according to the exemplary embodiment.

FIG. 3 is a block diagram of the job log control server 4. The job log control server 4 includes a communications section 40 connected to the network 3, a control section 41 equipped with a CPU, a ROM, a RAM, and so on, and for controlling every section of this server 4, a storage device 42 composed of an HDD and so on, an input section 43 provided with a keyboard, a mouse, and so on, and a display section 44 composed of an LCD or the like and for displaying a setting screen and so on.

In the ROM of the control section 41, there are stored various kinds of programs, and the CPU of the control section 41 controls every section of the job log control server 4 in accordance with the program stored in the ROM.

The storage device 42 is for storing the log images and job logs transferred from each of the multifunction devices 2, the setting screen and so on, and the log images are stored in conjunction with the respective job logs.

Operation of the Exemplary Embodiment

The operation of the exemplary embodiment will now be explained dividing into cases.

1. Administrator Setting Mode

The administrator of the system 1 or the multifunction device 2 inputs the password by operating the operation/display section 21 of the multifunction device 2, and when the administrator is identified as the true administrator, the mode is switched to the administrator setting mode. The administrator makes the operation/display section 21 display the image logging function setting screen by selecting the "image logging function setting" button from the menu screen.

If the administrator sets the image logging function to "ON" (enabled) or "OFF" (disabled) by selecting either one of them on the image logging function setting screen, the control section 20 stores the image logging function setting information in the storage device 24.

After selecting the image logging function "ON," the administrator then makes the operation/display section 21 display the log image creation setting screen. And, when the administrator sets the log image creation method and the log image transfer timing by selecting one from plural alternatives on the log image creation setting screen, and also sets the log image creation guarantee level by selecting either one of "HIGH" and "LOW" on the log image creation setting screen, the control section 20 stores the setting information in the storage device 24. After storing the information, the mode is switched from the administrator setting mode to the normal mode. It is assumed here that nighttime is selected as the log image transfer timing out of the alternatives of power-on, job termination, nighttime, and so on.

2. Normal Mode

Figure 4:
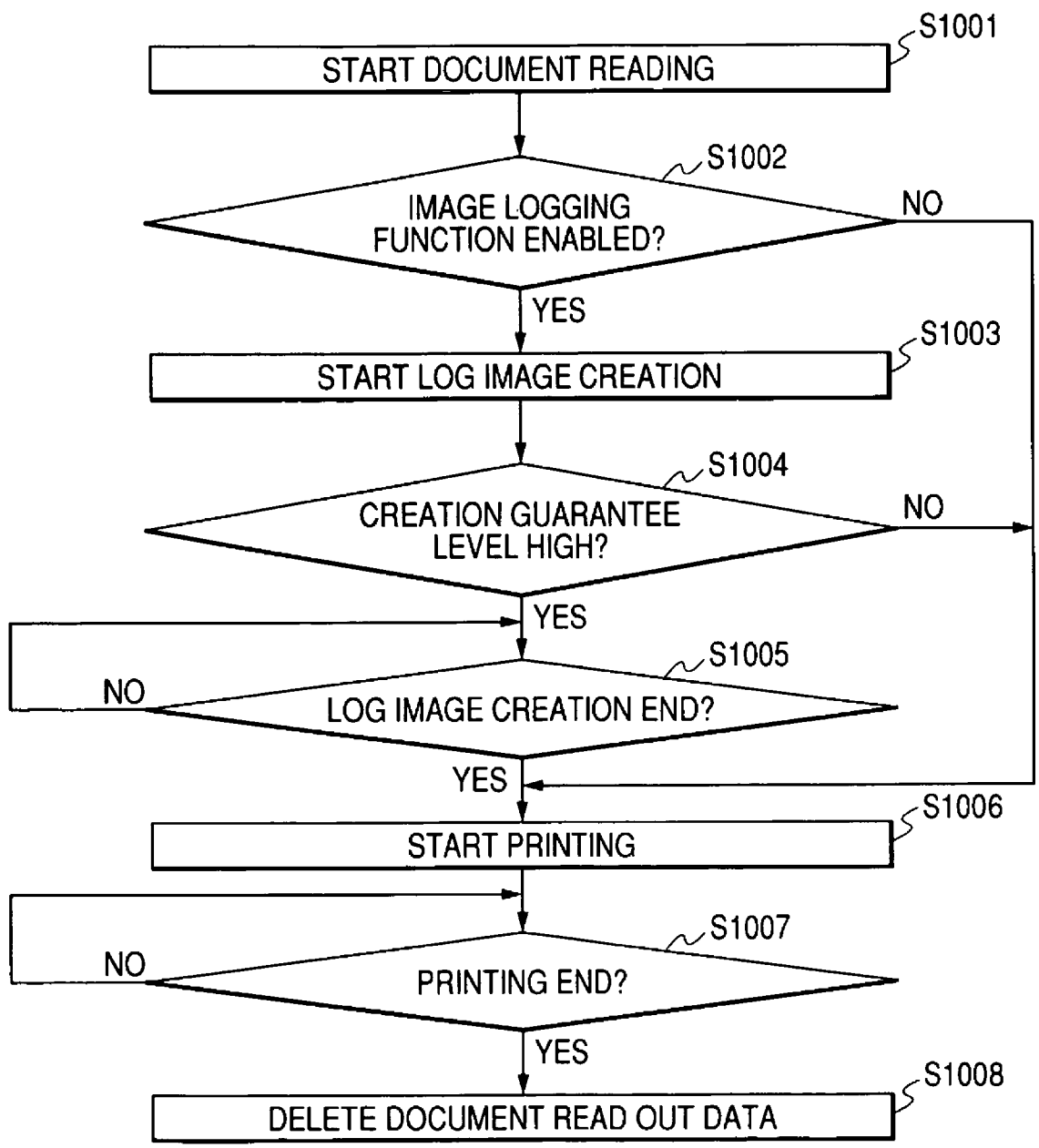
FIG. 4 is a flowchart showing the normal mode operation of the multifunction device according to the exemplary embodiment.

FIG. 4 is a flowchart of the multifunction device 2 in the normal mode. FIG. 4 shows the case in which copying is selected as the job, for example.

The user sets the document on a document bed (not shown) or an automatic document feeder (ADF), selects copying as the job from the main menu, sets the detailed settings for the copy job such as the sheet size or the number of copies by operating the operation/display section 21 of the multifunction device 2, and pushes the start key of the operation/display section 21 to make the image scanning section 22 read the document (step S1001).

When the scanning of the document is started, the job control section 25 issues the multifunction device ID and the job ID, and controls the copy job based on the multifunction device ID and the job ID. Further, the control section 20 judges whether or not the image logging function is enabled in accordance with the image logging function setting information stored in the storage device 24 (step S1002).

The control section 20 stores the document image (document scanning data), which the image scanning section 22 has read out from the document, in the storage device 24.

If the image logging function is set to "ON" (enabled) (step S1002: YES), the log image creating section 251 of the job control section 25 starts creating the log image by executing the image processing operation in accordance with the log image creation method stored in the storage device 24 on the document image handled by the job (step S1003).

Further, at the same time, whether or not the administrator has set the log image creation guarantee level to "HIGH" is judged (step S1004).

If the log image creation guarantee level has been set to "HIGH," the control section 20 retrieves the document image from the storage device 24 and outputs the document image to the printing section 23 after the log image creation has been completed (step S1005: YES). The printing section 23 starts printing for printing out the document image on a sheet (step S1006). Note that, if the document is composed of one sheet and accordingly the log image is also composed of one sheet, "the log image creation has been completed" denotes that the creation of the whole log image has been completed. In contrast, if the log image is composed of plural sheets because the original document composed of plural pages is read, "the log image creation has been completed" denotes that the creation of all of the log image of necessary number of sheets has been completed.

After completion of the printing (step S1007), the document scanning data thus printed out is deleted from the storage device 24 (step S1008). The job log generating/accumulating section 250 of the job control section 25 generates and then accumulates the job log after the job has been executed.

If the log image creation guarantee level is set to "LOW" in the step S1004 (step S1004: NO), the printing is started immediately without waiting for completion of the log image creation (S1006).

If the image logging function is set to "OFF" (disabled) in the step S1002 (step S1002: NO), the printing is started without creating the log image (S1006).

3. Transfer of Job Log And Log Image

When the nighttime comes, which is the job log transfer timing set as described above, the control section 20 detects it and transfers the log images accumulated in the storage device 24 with the job logs accumulated in the job log generating/accumulating section 250 to the job log control server 4 in a lump via the network communications section 26 and the network 3. The control section 41 of the job log control server 4 receives the job logs and the log images transferred from the multifunction device 2 by the communications section 40, and stores the job logs and the log images in the storage device 42 so that the log images are associated with the respective job logs.

The job logs and the log images can be stored so as to be associated with each other, by, for example, storing each of the job logs and the log images in conjunction with the multifunction device ID and the job ID. The job logs and the log images are provided to the administrator for controlling the jobs.

FIG. 5 shows some timing charts in the copy job of the multifunction device 2 according to a specific example of the invention.

Figure 5A:
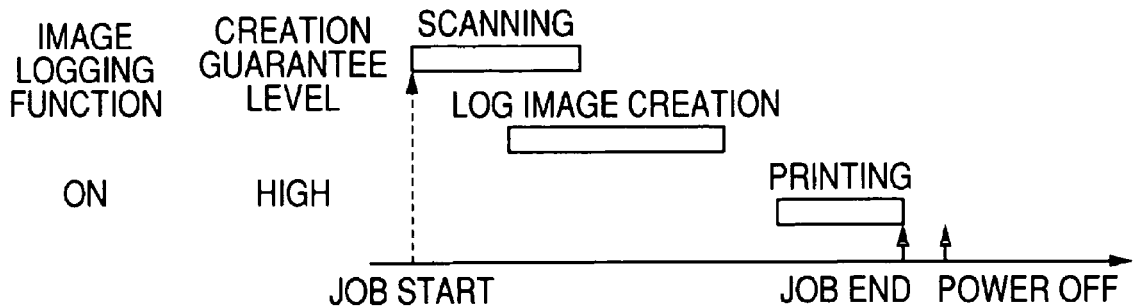
FIGS. 5A through 5C are timing charts showing the operation of the multifunction device according to another embodiment of the invention.

FIG. 5A is a timing chart in the case in which the image logging function is set to "ON" and the log image creation guarantee level is set to "HIGH." The job is started with the document scanning, and the printing is executed after the log image has been completely created. The log image is transferred to and accumulated in the job log control server 4 with a predetermined timing after being created.

In the case of FIG. 5A, since an image whose log image is not created is not printed out, and the log image is always accumulated, if a document is leaked, the source of the leakage can be specified from the log image and the job log, and thus the higher security level can be obtained.

Figure 5B:
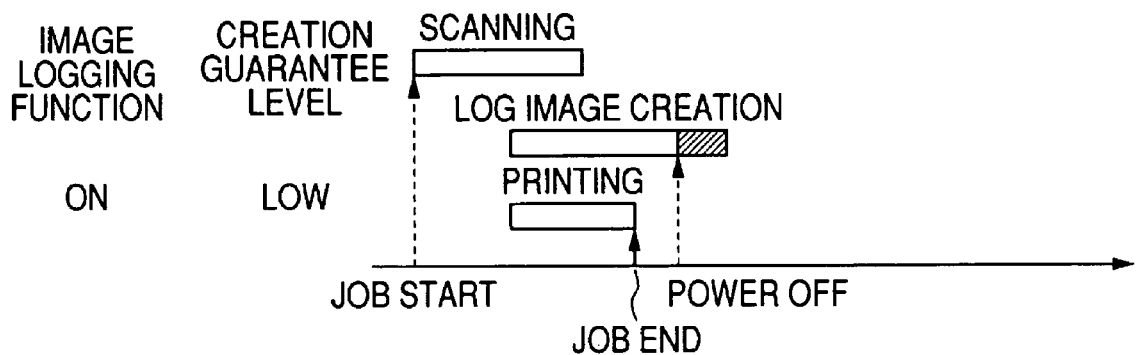

FIG. 5B is a timing chart in the case in which the image logging function is set to "ON" and the log image creation guarantee level is set to "LOW." The job is started with the document scanning, and the printing is executed without waiting for the completion of the log image creation. Note that, although the start timing of printing shown in FIG. 5B is concurrent with the start of the log image creation, it can be in the middle of the log image creation.

In the case of FIG. 5B, the length of time before the job termination can be shorter compared to the case of FIG. 5A. In the case in which the image logging function is set to "ON" and the log image creation guarantee level is set to "LOW," a part of the log image has not been created at the termination of the printing in some cases. In such a case, if the user turns off the multifunction device 2 after the termination of the printing and prior to the completion of the log image creation, a part of the log image to be created thereafter is missing. Therefore, if the effect to the performance of the job processing needs to be minimize while the missing of the log image can be tolerated to some extent, the viewpoint of the performance can be given a priority. In contrast, in the case of FIG. 5A, even if the multifunction device 2 is powered OFF at any time after termination of the printing, the log image is always created and transferred to the job log server 4 for accumulation with no missing part, thus offering a higher security level.

Figure 5C:
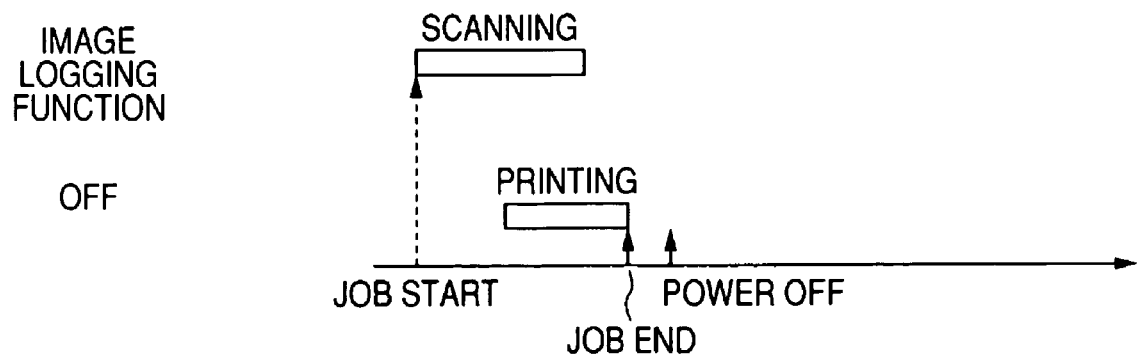

FIG. 5C is a timing chart of the case in which the image logging function is set to "OFF." After the document scanning is terminated, the printing is started without creating the log image. The length of time before the job termination can be shorter in comparison with the case of FIG. 5A. However, since the source of any leakage of a document cannot be specified, the security level is not as high as the above.

Other Embodiments

Note that the invention is not limited to the embodiments described above, but can be put into practice in variously modified forms within the scope or the spirit of the invention.

For example, the image input can be provided, besides by reading out the document with a device, by inputting from the user terminals, by receiving via facsimile communication, or by reading from a scanner connected to the device.

In addition to the output control, whether or not a new job is accepted can also be controlled. By refusing to accept a new job, the number of jobs accumulated in the image processing device can be prevented from increasing, thus enhancing the job processing performance.

Further, it is also possible that, by making the image scanning section optically read an instruction form with job content and the log image creation conditions written thereon, the log image creating section creates the log image based thereon.

Further, although the job logs and the log images are stored in the control server in the embodiments described above, they can be stored in the multifunction devices of other external storage devices instead of the control server. Still further, the job logs and the log images can be stored in respective devices different from each other.

Further, a thumbnail image composed of a plurality of log images can be created. Thus, the contents of the log images can quickly be figured out and confirmed.

Still further, although the ON/OFF setting of the image logging function and the log image creation guarantee level are set by the administrator in the embodiments described above, either one or both of them can be set by the user. Thus, the user can select which one of the viewpoint of security or the viewpoint of performance should be given a priority. For example, the user can set the image logging function to "OFF" if the user wants to temporarily give a priority to the job processing performance over the security.

What is claimed is:

1. A computer readable medium storing a program causing a computer to execute a function for an image processing, the function comprising:
   executing a job;
   creating a log image from an image handled in the job wherein the log image is created by decreasing an amount of information of the image handled in the job;
   setting a creation guarantee level of the log image that determines the timing for the execution of the job;
   wherein if the creation guarantee level is set to a high level, controlling the execution of the job to wait until the log image has been created to execute the job,
   and wherein if the creation guarantee level is set to a low level, the execution of the job is performed irrespective of completion of the log image creation.

2. The computer readable medium according to claim 1, the function further comprising:
   setting ON/OFF of the image logging function, wherein the creation of the log image, the setting of the creation guarantee level of the log image, and the control of the completion of the job are enabled if the image logging function is set to ON.

3. The computer readable medium according to claim 1, further comprising:
   generating a job log after the execution of the job; and
   accumulating the job log in conjunction with the log image created from the image handled in the job.

4. The computer readable medium according to claim 1, wherein
   the creation of the log image indicates creating the log image from the image handled in the job by extracting image data from the job and creating the log image as a representation of the image data in the job.

5. The computer readable medium according to claim 1, wherein
the creation of the log image indicates creating the log image from the image handled in the job by extracting image data from the job and creating the log image as a representation of the image data in the job.

6. The computer readable medium according to claim 1, wherein the creation guarantee level indicates a security or importance level of the job.

7. The computer readable medium according to claim 1, wherein the creation guarantee level indicates a security or importance level of the job.

8. An image processing method in an image processing device, comprising:
executing a job relating to image processing in the image processing device;
creating a log image from an image handled in the job wherein the log image is created by decreasing an amount of information of the image handled in the job;
setting a creation guarantee level of the log image that determines the timing for the execution of the job;
wherein if the creation guarantee level is set to a high level, controlling the execution of the job to wait until the log image has been created to execute the job,
and wherein if the creation guarantee level is set to a low level, the execution of the job is performed irrespective of completion of the log image creation.

9. An image processing device, comprising:
an execution unit that executes a job;
a creation unit that creates a log image from an image handled in the job wherein the log image is created by decreasing an amount of information of the image handled in the job;
a setting unit that sets a creation guarantee level of the log image that determines the timing for the execution of the job;
and a control unit that controls the execution of the job to wait until the log image has been created to execute the job, if the creation guarantee level is set to a high level;
and the execution of the job is performed irrespective of completion of the log image creation, if the creation guarantee level is set to a low level.

10. An image processing system comprising:
an image processing device executing a job, the image processing device comprising:
an execution unit that executes the job;
a job log generation unit that generates a job log after execution of the job;
a log image creation unit that creates a log image from an image handled in the job wherein the log image is created by decreasing an amount of information of the image handled in the job;
a setting unit that sets a creation guarantee level of the log image that determines the timing for the execution of the job;
a control unit that gives a priority to either one of the execution of the job and the creation of the log image in accordance with the creation guarantee level;
wherein the control unit controls the execution of the job to wait until the log image has been created to execute the job, if the creation guarantee level is set to a high level;
and the execution of the job is performed irrespective of completion of the log image creation, if the creation guarantee level is set to a low level;
and a transfer unit that transfers the job log and the log image to an external device,
and a control server connectable to the image processing device via a network, the control server comprising:
a storage device that stores the job log and the log image transferred from the transfer unit so as to be associated with each other.

* * * * *